United States Patent
Dudar et al.

(10) Patent No.: US 10,113,853 B2
(45) Date of Patent: Oct. 30, 2018

(54) METHODS FOR POSITIONING RECHARGEABLE TIRE PRESSURE MONITORING SENSORS

(71) Applicant: Ford Global Technologies, LLC, Dearborn, MI (US)

(72) Inventors: Aed M. Dudar, Canton, MI (US); Mahmoud Yousef Ghannam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 205 days.

(21) Appl. No.: 15/085,499

(22) Filed: Mar. 30, 2016

(65) Prior Publication Data

US 2017/0284786 A1    Oct. 5, 2017

(51) Int. Cl.
| G01B 5/25 | (2006.01) |
| G01B 5/255 | (2006.01) |
| B60C 23/04 | (2006.01) |

(52) U.S. Cl.
CPC .......... *G01B 5/255* (2013.01); *B60C 23/041* (2013.01); *G01B 2210/10* (2013.01)

(58) Field of Classification Search
CPC .............. B60C 23/041; B60C 23/0416; B60C 23/0488; B60C 23/04; B60C 23/0491; B60C 23/0498; G01B 2210/10; G01B 5/255
USPC ......................................................... 33/533
See application file for complete search history.

(56) References Cited

U.S. PATENT DOCUMENTS

| 4,442,708 A * | 4/1984 | Gable ................ G01M 15/102 |
| | | 73/116.06 |
| 6,457,351 B1 * | 10/2002 | Yamamoto ........ G01M 17/0072 |
| | | 73/116.05 |
| 7,415,771 B2 * | 8/2008 | Harrill ................ B60G 17/019 |
| | | 33/203.18 |
| 7,770,443 B2 | 8/2010 | Varpula et al. |
| 9,139,054 B2 * | 9/2015 | Lammers ............ B60C 23/0461 |
| 9,393,845 B2 * | 7/2016 | Lammers ............ B60C 23/0461 |
| 9,415,643 B2 * | 8/2016 | Lammers ............ B60C 23/0416 |

(Continued)

FOREIGN PATENT DOCUMENTS

| CN | 101420134 A | 4/2009 |
| CN | 202029656 U | 11/2011 |

(Continued)

OTHER PUBLICATIONS

Search Report dated Aug. 29, 2017 for GB Patent Application No. 1704379.5. (3 pages).

*Primary Examiner* — Yaritza Guadalupe-McCall
(74) *Attorney, Agent, or Firm* — James P. Muraff; Neal, Gerber & Eisenberg LLP (57) ABSTRACT

Example systems and methods for aligning tire pressure monitoring sensors on a vehicle are disclosed. An example disclosed method includes positioning the front wheels on first and second dynamometers. The example method also includes aligning, with the first and second dynamometers, the tire pressure monitoring sensors of the front wheels. The example method includes positioning the rear wheels on the first and second dynamometers. Additionally, the example method includes aligning, with the first and second dynamometers, the tire pressure monitoring sensors of the rear wheels.

16 Claims, 5 Drawing Sheets

(56) References Cited

U.S. PATENT DOCUMENTS

| | | | |
|---|---|---|---|
| 9,760,247 B2* | 9/2017 | Watanabe | G01M 17/0072 |
| 9,841,351 B2* | 12/2017 | Reiter | G01M 13/025 |
| 2005/0132587 A1* | 6/2005 | Larson | G01B 21/26 |
| | | | 33/203.12 |
| 2007/0235969 A1* | 10/2007 | Harrill | B60G 7/006 |
| | | | 33/264 |
| 2009/0106990 A1* | 4/2009 | Harrill | B60G 7/006 |
| | | | 33/288 |
| 2014/0092236 A1* | 4/2014 | Findeisen | G06K 9/00791 |
| | | | 348/118 |
| 2015/0057873 A1* | 2/2015 | Lammers | B60C 23/0461 |
| | | | 701/29.7 |
| 2016/0016444 A1* | 1/2016 | Lammers | B60C 23/0416 |
| | | | 701/29.6 |
| 2016/0039256 A1* | 2/2016 | Lammers | B60C 23/0461 |
| | | | 701/29.7 |
| 2016/0272017 A1* | 9/2016 | Ghannam | B60T 7/12 |
| 2017/0284786 A1* | 10/2017 | Dudar | B60C 23/041 |

FOREIGN PATENT DOCUMENTS

| | | |
|---|---|---|
| CN | 102336231 A | 2/2012 |
| CN | 102431397 A | 5/2012 |
| CN | 202294099 U | 7/2012 |
| GB | 2546582 A | 7/1917 |
| KR | 20140099085 A | 8/2014 |

* cited by examiner

METHODS FOR POSITIONING RECHARGEABLE TIRE PRESSURE MONITORING SENSORS

TECHNICAL FIELD

The present disclosure generally relates to vehicles with tire pressure monitoring system sensors and, more specifically, methods for positioning rechargeable tire pressure monitoring system sensors.

BACKGROUND

Vehicles have a tire pressure monitoring system (TPMS) sensors for each tire. The TPMS sensors measure the pressure of the corresponding vehicle tire. The TPMS sensors are located on the interior of the time rim. Traditionally, replacing a battery of a TPMS sensor involves removing the wheel and separating the tire from the rim. For that reason, TPMS sensors are designed so that that battery lasts seven to ten years before being replaced. To do this, the TPMS sensors conserve their power by transmitting signals at a low frequency. For example, the TPMS sensor may transmit once every thirty seconds.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments for aligning tire pressure monitoring sensors on a vehicle are disclosed. An example method includes positioning the front wheels on first and second dynamometers. The example method also includes aligning, with the first and second dynamometers, the tire pressure monitoring sensors of the front wheels. The example method includes positioning the rear wheels on the first and second dynamometers. Additionally, the example method includes aligning, with the first and second dynamometers, the tire pressure monitoring sensors of the rear wheels.

Another example method includes positioning front wheels of a vehicle on first and second dynamometers. The example method also includes positioning rear wheels of the vehicle on third and fourth dynamometers. Additionally, the example method includes independently rotating the first and second dynamometers to position front tire pressure monitoring system sensors of the front wheels. The example method includes determining an alignment position for rear tire pressure monitoring system sensors and independently rotating the third and fourth dynamometers to position the rear wheels into the alignment position.

An example system includes a first set of dynamometers configured to receive a first set of wheels and a second set of dynamometers configured to receive a second set of wheels. The example system also includes a plurality of alignment detectors. The example system includes a wheel aligner communicatively coupled to the first and second sets of dynamometers and the plurality of alignment detectors. In the example system, the wheel aligner is configured to independently rotate the first set of dynamometers to align a first set of tire pressure monitoring system sensors corresponding to the first set of wheels, determine an alignment position for a second set of tire pressure monitoring system sensors corresponding to the second set of wheels, and independently rotate the second set of dynamometers to position the second set of wheels into the alignment position.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Rechargeable tire pressure monitoring system (TPMS) sensors include secondary coils that are used to recharge the batteries of the TPMS sensors through inductive coupling. As electric and electric hybrid vehicles become increasingly popular, inductive charging stations in parking spaces (e.g., in a garage) are becoming more common. The inducting charging stations may include a mode to charge the batteries of the TPMS sensors. Facilitating more frequent recharging of the batteries of the TMPS sensors means the TMPS sensor may transmit more frequently. This allows the tire pressure monitoring system to detect and react to problems with the tires quicker. However, inductive charging becomes less efficient (e.g. slower) when the secondary coil of the TPMS sensor is not parallel to the primary coil in the inductive charging station.

As disclosed herein below, after the TPMS sensors are installed on the rims of the wheels and the tires are installed on the wheels, the wheels of the vehicle are positioned on dynamometers (sometimes referred to as a "dyno"). The dynamometers independently spin the wheels. In some examples, two dynamometers are used to align one set of wheels (e.g., the front wheels or the rear wheels) and then the other set of wheels. In some examples, four dynamometers are used to align the four wheels. TPMS sensor receivers are positioned proximate the dynamometers. The TPMS sensor receivers detect the sensor readings broadcast by the TPMS sensors to determine the location of the TPMS sensors relative the perpendicular axis of the wheels. The wheels are independently aligned so that (a) the TPMS sensors on the front wheels are at substantially the same portion relative to the perpendicular axis of the front wheels, (b) the TPMS sensors on the rear wheels are at substantially same position relative to the perpendicular axis of the rear wheels, and (c) the relative positions of the front TPMS sensors and the rear TPMS sensors are such that if the front TPMS sensors are parallel to the primary coil of the inductive charging station, when the vehicle is driven forward a distance that separates the front and rear wheels, the rear TPMS sensors will be parallel to the primary coil of the inductive charging station.

Figure 1A:
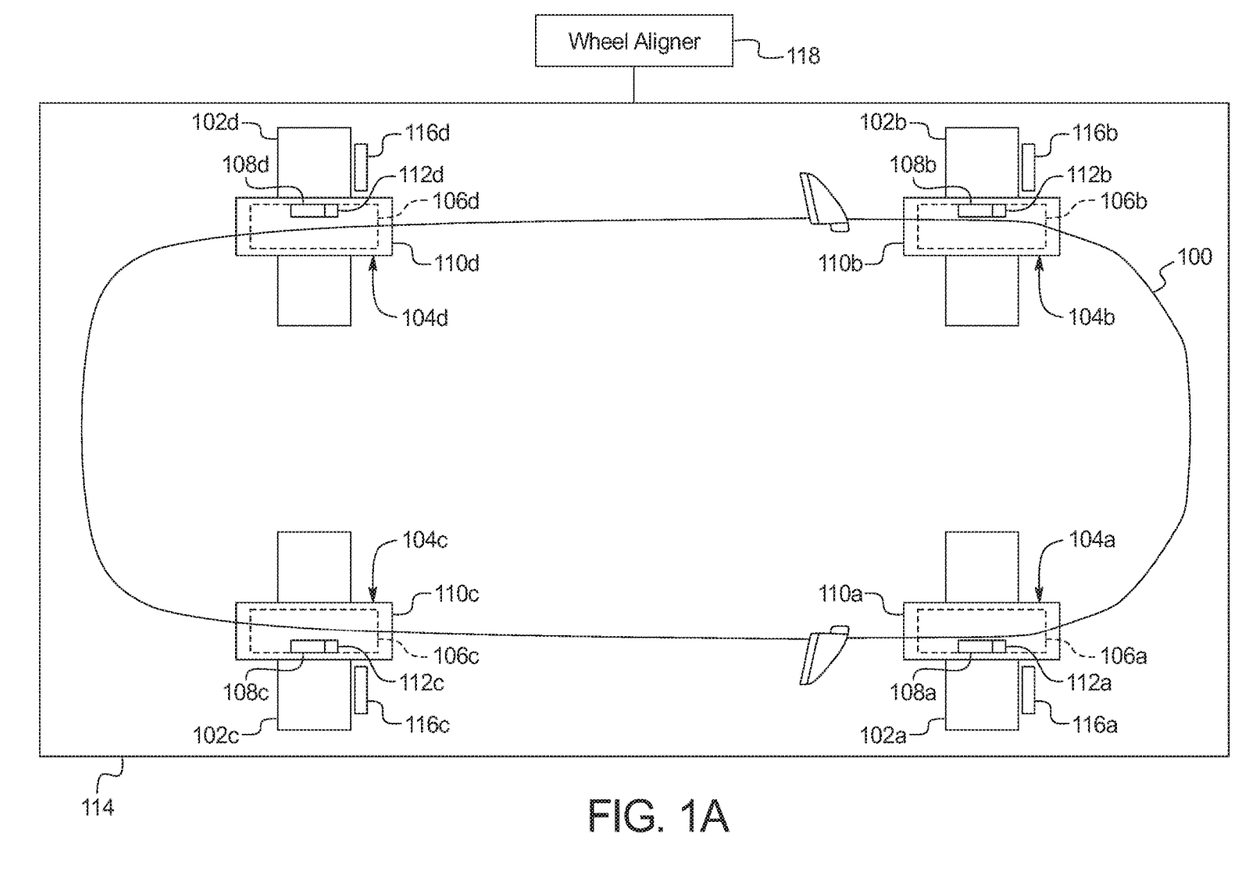
FIGS. 1A and 1B illustrate a vehicle positioned on independent dynamometers according to the teachings of this disclosure.
Figure 1B:
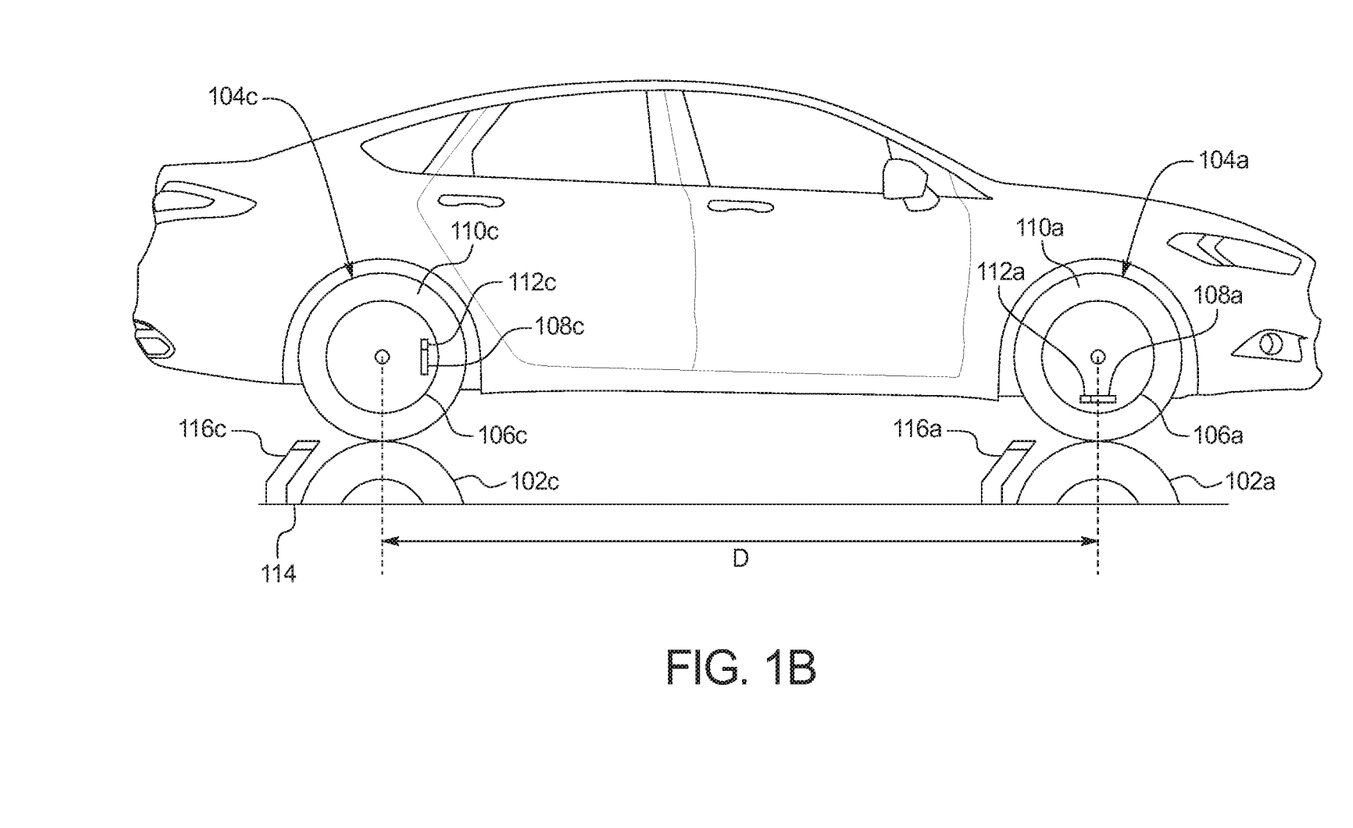

FIGS. 1A and 1B illustrate a vehicle 100 positioned on independent dynamometers 102a, 102b, 102c, and 102d according to the teachings of this disclosure. The vehicle 100 (e.g., a sedan, a truck, a sports utility vehicle, etc.) may be a standard gasoline powered vehicle, a hybrid vehicle, an electric vehicle, a fuel cell vehicle, or any other type of vehicle. The vehicle 100 may be non-autonomous, semi-autonomous, or autonomous. The vehicle 100 includes parts related to mobility, such as a powertrain with an engine, a transmission, a suspension, and/or a driveshaft. The vehicle includes a front right wheel 104a, a front left wheel 104b, a rear right wheel 104c, and a real left wheel 104d. The wheels 104a, 104b, 104c, and 104d include rims 106a, 106b, 106c, and 106d, TPMS sensors 108a, 108b, 108c, and 108d, and tires 110a, 110b, 110c, and 110d respectively.

The TPMS sensors 108a, 108b, 108c, and 108d are positioned between the rims 106a, 106b, 106c, and 106d, and the tires 110a, 110b, 110c, and 110d. The TPMS sensors 108a, 108b, 108c, and 108d monitors the pressure of the corresponding tires 110a, 110b, 110c, and 110d. To communicate the pressure readings, the TPMS sensors 108a, 108b, 108c, and 108d include transmitters 112a, 112b, 112c, and 112d. The vehicle 100 includes receivers (not shown) on a non-rotating portion of the wheel assembly of the wheels 104a, 104b, 104c, and 104d to receive the pressure readings from the TPMS sensors 108a, 108b, 108c, and 108d. The transmitters 112a, 112b, 112c, and 112d have a short range (e.g., three to six inches, etc.) to conserve power and to avoid signal collision with each other.

The dynamometers 102a, 102b, 102c, and 102d are incorporated into an alignment platform 114. The dynamometers 102a, 102b, 102c, and 102d protrude from the alignment platform 114 so that the wheels 104a, 104b, 104c, and 104d may be positioned on the dynamometers 102a, 102b, 102c, and 102d. When the wheels 104a, 104b, 104c, and 104d are positioned on the dynamometers 102a, 102b, 102c, and 102d, rotation of the each of the dynamometers 102a, 102b, 102c, and 102d causes the corresponding wheel 104a, 104b, 104c, and 104d to rotate. In some examples, the alignment platform 114 includes four dynamometers 102a, 102b, 102c, and 102d. In such examples, the four wheels 104a, 104b, 104c, and 104d are positioned on dynamometers 102a, 102b, 102c, and 102d at the same time. Alternatively, in some examples, the alignment platform 114 includes two dynamometers 102a and 102b. In such examples, the front wheels 104a and 104b are aligned separately from the rear wheels 104c and 104d. In some examples, distances between the dynamometers 102a, 102b, 102c, and 102d are adjustable to accommodate vehicles 100 with different wheel bases.

The alignment platform 114 includes one or more TPMS alignment detectors 116a, 116b, 116c, and 116d positioned proximate to the dynamometers 102a, 102b, 102c, and 102d.

In some examples, the alignment platform 114 includes TPMS alignment detectors 116a, 116b, 116c, and 116d for each of the dynamometers 102a, 102b, 102c, and 102d. Alternatively, in some examples, the alignment platform 114 includes one or more portable TPMS alignment detectors 116a, 116b, 116c, and 116d that may be, from time to time, positioned (e.g., manually, or automatically) proximate the dynamometers 102a, 102b, 102c, and 102d. In some examples, the TPMS alignment detectors 116a, 116b, 116c, and 116d include primary coils to detect when the secondary coil corresponding TPMS sensor 108a, 108b, 108c, and 108d is parallel to the primary coil. In such examples, the TPMS alignment detectors 116a, 116b, 116c, and 116d include load detection circuits to detect when the primary coil of the TPMS alignment detectors 116a, 116b, 116c, and 116d is inductively coupled to the secondary coil of the TPMS sensor 108a, 108b, 108c, and 108d. Alternatively, in some examples, the TPMS alignment detectors 116a, 116b, 116c, and 116d detect the transmissions from the TPMS sensors 108a, 108b, 108c, and 108d when the TPMS sensors 108a, 108b, 108c, and 108d are positioned at the bottom of the wheel 104a, 104b, 104c and 104d.

As discussed in more detail below in connection with FIG. 2, the dynamometers 102a, 102b, 102c, and 102d and the TPMS alignment detectors 116a, 116b, 116c, and 116d are communicatively coupled to a wheel aligner 118. The wheel aligner 118 positions the TPMS sensors 108a, 108b, 108c, and 108d so that (a) initially, secondary coils of the front TPMS sensors 108a and 108b are parallel to the primary coil of the recharging surface, and (b) after the front TPMS sensors 108a and 108b are charged and a driver drives forward to position the rear wheels 104c and 104d on the recharging surface, the secondary coils of the rear TPMS sensors 108c and 108d are parallel to the primary coil of the recharging surface. The wheel aligner 118 controls the rotation of the dynamometers 102a, 102b, 102c, and 102d independently. Additionally, the wheel aligner 118 uses the TPMS alignment detectors 116a, 116b, 116c, and 116d to determine the locations of the TPMS sensors 108a, 108b, 108c, and 108d relative to the perpendicular axis of the wheels 104a, 104b, 104c, and 104d. In some examples, the wheel aligner 118 determines a distance (D) between the center of the front wheels 104a and 104b and the center of the rear wheels 104c and 104d. In some such examples, an operator enters the distance (D) into the wheel aligner 118. Alternatively, in some such examples, the wheel aligner 118 is communicatively coupled to a vehicle database (not shown) that includes the distance(s) (D) of the vehicle(s) 100 to be aligned.

Figure 2:
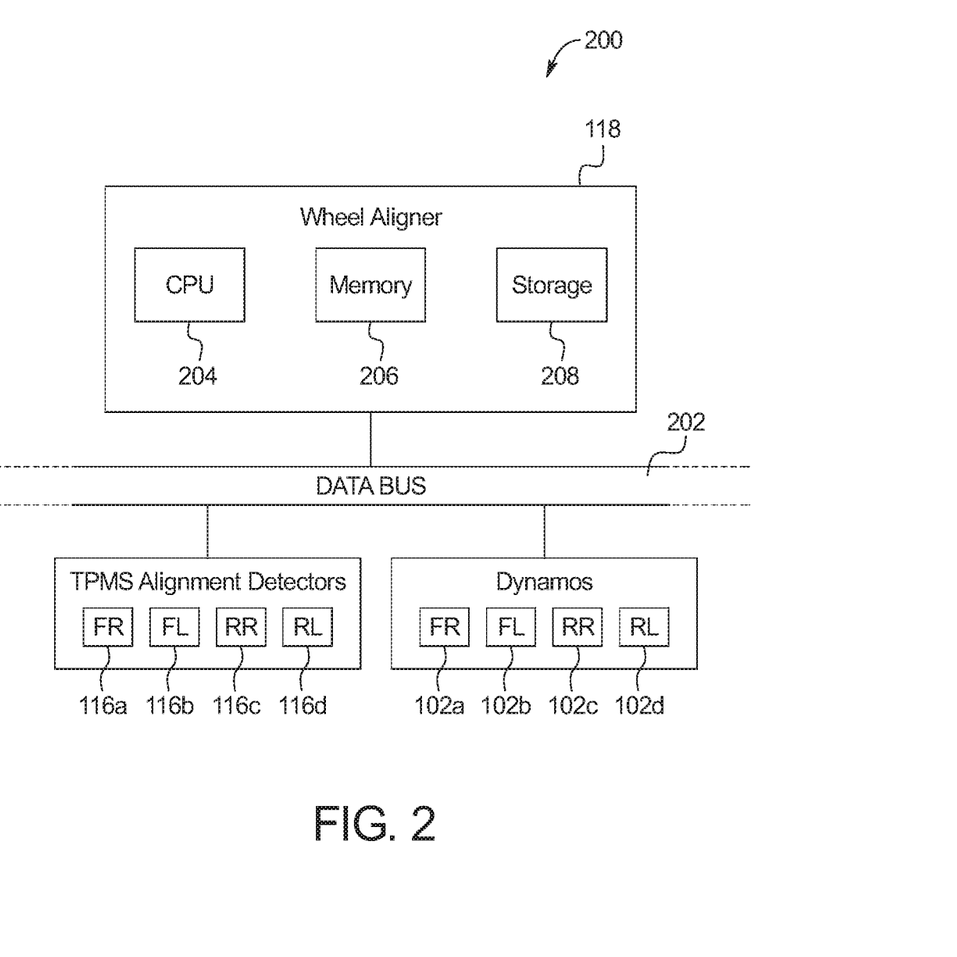
FIG. 2 is a block diagram of electronic components used to control the dynamos of FIGS. 1A and 1B.

FIG. 2 is a block diagram of electronic components 200 used to control the dynamometers 102a, 102b, 102c and 102d of FIGS. 1A and 1B. The electronic components include the wheel aligner 118, the TPMS alignment detectors 116a, 116b, 116c, and 116d, the dynamometers 102a, 102b, 102c, and 102d, and a data bus 202. The wheel aligner 118 includes a processor or controller 204, memory 206, and storage 208. The processor or controller 204 may be any suitable processing device or set of processing devices such as, but not limited to: a microprocessor, a microcontroller-based platform, a suitable integrated circuit, one or more field programmable gate arrays (FPGSs), and/or one or more application-specific integrated circuits (ASICs). The memory 206 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), and read-only memory. In some examples, the memory 206 includes multiple kinds of memory, particularly volatile memory and non-volatile memory. The storage 208 may include any high-capacity storage device, such as a hard drive, and/or a solid state drive.

The memory 206 and the storage 208 are a computer readable medium on which one or more sets of instructions, such as the software for operating the methods of the present disclosure can be embedded. The instructions may embody one or more of the methods or logic as described herein. In a particular embodiment, the instructions may reside completely, or at least partially, within any one or more of the computer readable medium, and/or within the processor 204 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The TPMS alignment detectors 116a, 116b, 116c, and 116d, and the dynamometers 102a, 102b, 102c, and 102d, are communicatively coupled to the wheel aligner 118 via the data bus 202. The wheel aligner 118 receives alignment information from the TPMS alignment detectors 116a, 116b, 116c, and 116d that indicates when the corresponding TPMS sensors 108a, 108b, 108c, and 108d are at the bottom of the wheel rims 106a, 106b, 106c, and 106d. The wheel aligner 118 sends control signals to control the rotation of the dynamometers 102a, 102b, 102c, and 102d. The data bus 202 is any suitable bus to communicate with sensors (e.g., the TPMS alignment detectors 116a, 116b, 116c, and 116d) and actuators (e.g., the dynamometers 102a, 102b, 102c, and 102d). In some examples, the data bus 202 is an Ethernet bus, or a fieldbus (IEC 61158).

Figure 3:
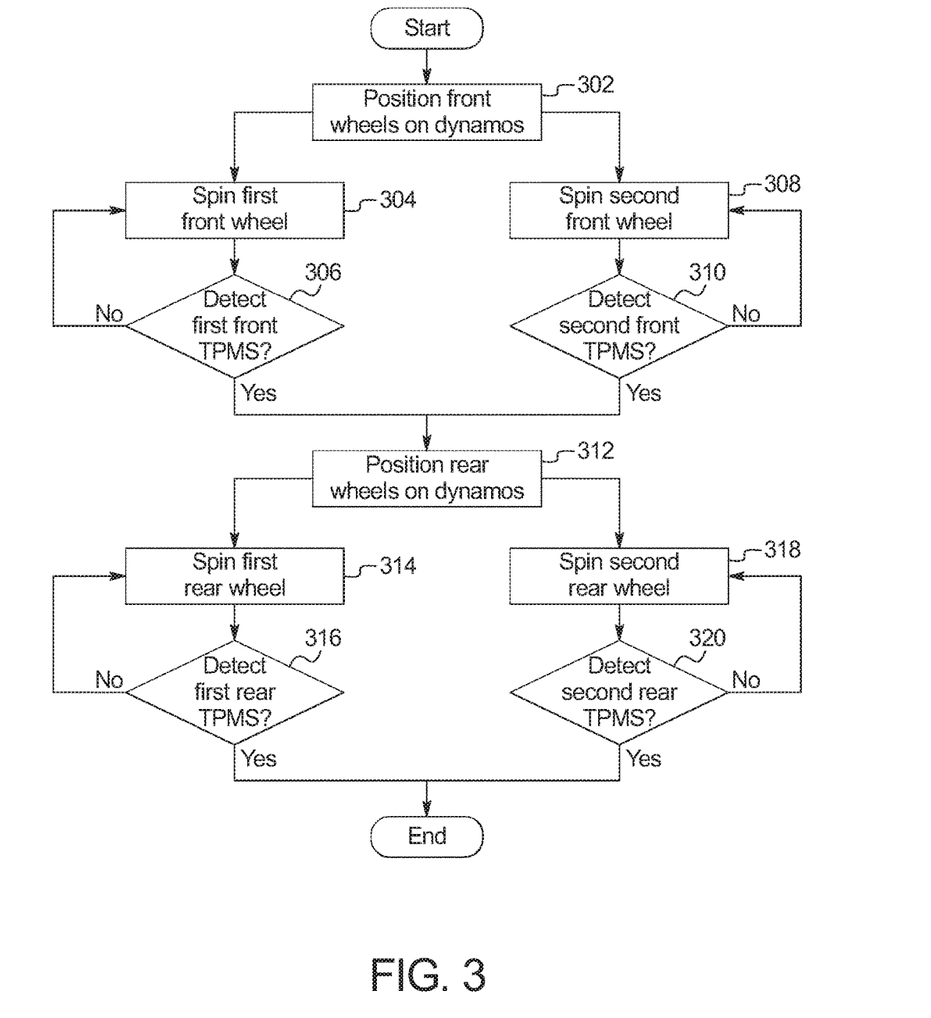
FIG. 3 is a flowchart depicting an example method to position rechargeable tire pressure monitoring system sensors that may be implemented by the electronic components of FIG. 2.

FIG. 3 is a flowchart depicting an example method to position the TPMS sensors 108a, 108b, 108c, and 108d that may be implemented by the electronic components 200 of FIG. 2. The flowchart of FIG. 3 depicts a method when the alignment platform 114 includes two of the dynamometers 102a and 102b. Initially, the front wheels 104a and 104b are positioned on the dynamometers 102a and 102b (block 302). The wheel aligner 118 spins the first front wheel 104a (block 304). The wheel aligner 118 continues to spin the first front wheel 104a until the first front TPMS alignment detector 116a detects that first front TPMS sensor 108a is positioned at the bottom of the first front wheel 104a (block 306). The wheel aligner 118 spins the second front wheel 104b (block 308). The wheel aligner 118 continues to spin the second front wheel 104b until the second front TPMS alignment detector 116b detects that second front TPMS sensor 108b is positioned at the bottom of the second front wheel 104b (block 310).

The rear wheels 104c and 104d are positioned on the dynamometers 102a and 102b (block 312). The wheel aligner 118 spins the first rear wheel 104c (block 314). The wheel aligner 118 continues to spin the first rear wheel 104c until the first rear TPMS alignment detector 116c detects that first rear TPMS sensor 108c is positioned at the bottom of the first rear wheel 104c (block 316). The wheel aligner 118 spins the second rear wheel 104d (block 318). The wheel aligner 118 continues to spin the second rear wheel 104d until the second rear TPMS alignment detector 116d detects that second rear TPMS sensor 108d is positioned at the bottom of the second rear wheel 104d (block 320). The method of FIG. 3 then ends.

Figure 4:
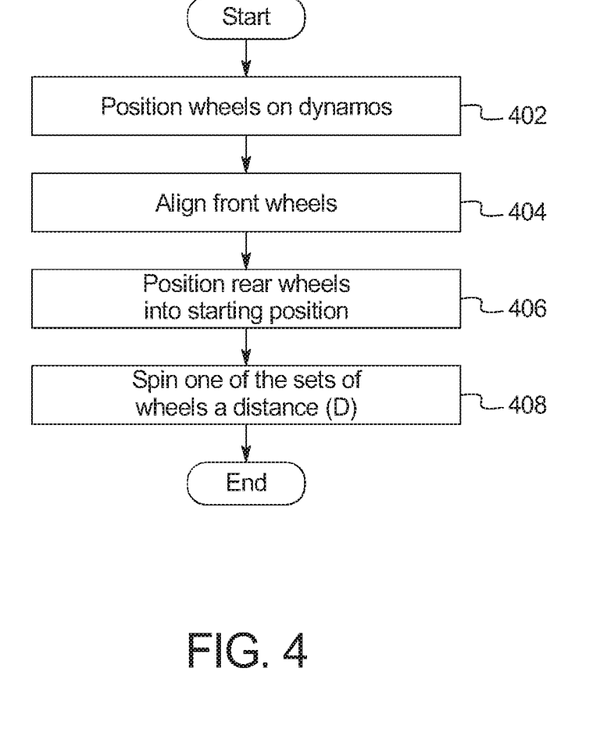
FIG. 4 is another flowchart depicting an example method to position rechargeable tire pressure monitoring system sensors that may be implemented by the electronic components of FIG. 2.

FIG. 4 is another flowchart depicting an example method to position rechargeable TPMS sensors 108a, 108b, 108c, and 108d that may be implemented by the electronic components 200 of FIG. 2. The flowchart of FIG. 4 depicts a method when the alignment platform 114 includes four of the dynamometers 102a, 102b, 102c, and 102d. Initially, the vehicle 100 is positioned so that each of the wheels 104a, 104b, 104c, and 104d is on a different one of the dynamometers 102a, 102b, 102c, and 102d (block 402). The wheel aligner 118 rotates the front wheels 104a and 104b so that the front TPMS sensors 108a and 108b are at the bottom of the front wheels 104a and 104b (block 404). The wheel aligner 118 rotates the rear wheels 104c and 104d so that the rear TPMS sensors 108c and 108d are at the bottom of the rear wheels 104c and 104d (block 406).

The wheel aligner 118 rotates one of the sets of wheels (e.g., the front wheels 104a and 104b, or the rear wheels 104c and 104d) to simulate traveling the distance (D) between the center of the front wheels 104a and 104b and the center of the rear wheels 104c and 104d (block 408). The amount (e.g., in degrees, in radians, etc.) the wheel aligner 118 rotates the set of wheels is based on the circumference of the wheels 104a, 104b, 104c, and 104d and the distance (D). For example, if the circumference of the wheels 104a, 104b, 104c, and 104d (with the tires) is 7.2 feet and the distance (D) is 8.5 feet, the wheel aligner 118 rotates the set of wheels 65 degrees (1.13 radians) (((8.5/7.2)%1)*360 degrees). When the set of wheels is the front wheels 104a and 104b, the wheel aligner 118 rotates the front wheels 104a and 104b clockwise. When the set of wheels is the rear wheels 104c and 104d, the wheel aligner 118 rotates the rear wheels 104c and 104d counterclockwise. The method of FIG. 4 then ends.

The flowcharts of FIGS. 3 and 4 are representative of machine readable instructions that comprise one or more programs that, when executed by a processor (such as the processor 204 of FIG. 2), implement the wheel aligner 118 of FIGS. 1A and 2. Further, although the example programs are described with reference to the flowchart illustrated in FIGS. 3 and 4, many other methods of implementing the example wheel aligner 118 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of The principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A method of aligning tire pressure monitoring sensors on a vehicle, the method comprising:
   positioning front wheels on first and second dynamometers;
   rotating a first one of the front wheels until a corresponding first one of the tire pressure monitoring sensors is positioned so that a secondary coil of the first one of the tire pressure monitoring sensors is parallel to the ground;
   rotating a second one of the front wheels until a corresponding second one of the tire pressure monitoring sensors is positioned so that the secondary coil of the second one of the tire pressure monitoring sensors is parallel to the ground;
   positioning rear wheels on the first and second dynamometers; and
   aligning, with the first and second dynamometers, the tire pressure monitoring sensors of the rear wheels.

2. The method of claim 1, including:
   detecting, with an alignment detector, when the first one of the tire pressure monitoring sensors is positioned so that the secondary coil of the first one of the tire pressure monitoring sensors is parallel to ground; and
   detecting, with the alignment detector, when the second one of the tire pressure monitoring sensors is positioned so that the secondary coil of the second one of the tire pressure monitoring sensors is parallel to the ground.

3. The method of claim 2, wherein detecting the first and second ones of the tire pressure monitoring sensors includes detecting when the secondary coil of the corresponding one of the tire pressure monitoring sensors is inductively coupled with a primary coil of the alignment detector.

4. The method of claim 2, wherein detecting the first and second ones of the tire pressure monitoring sensors includes detecting messages from the corresponding one of the tire pressure monitoring sensors with a transceiver of the alignment detector.

5. The method of claim 1, wherein aligning the tire pressure monitoring sensors of the rear wheels includes:
   rotating a first one of the rear wheels until a corresponding third one of the tire pressure monitoring sensors is positioned so that a secondary coil of the third one of the tire pressure monitoring sensors is parallel to the ground; and
   rotating a second one of the rear wheels until a corresponding fourth one of the tire pressure monitoring sensors is positioned so that the secondary coil of the fourth one of the tire pressure monitoring sensors is parallel to the ground.

6. A method comprising:
   positioning front wheels of a vehicle on first and second dynamometers;
   positioning rear wheels of the vehicle on third and fourth dynamometers;
   independently rotating the first and second dynamometers to position front tire pressure monitoring system sensors of the front wheels;
   determining an alignment position for rear tire pressure monitoring system sensors;
   independently rotating the second and third dynamometers to position the rear tire pressure monitoring system sensors of the rear wheels so that secondary coils of the rear tire pressure monitoring system sensors are parallel to the ground; and
   subsequently independently rotating the third and fourth dynamometers to position the rear wheels into the alignment position.

7. The method of claim 6, wherein independently rotating the first and second dynamometers to position first tire pressure monitoring system sensors of the front wheels includes:
   rotating a first one of the front wheels with the first dynamometer until a corresponding first one of the tire pressure monitoring system sensors is positioned so that a secondary coil of the first one of the tire pressure monitoring sensors is parallel to the ground; and
   rotating a second one of the front wheels with the second dynamometer until a corresponding second one of the tire pressure monitoring system sensors is positioned so that the secondary coil of the second one of the tire pressure monitoring sensors is parallel to the ground.

8. The method of claim 6, including detecting when the secondary coil of the corresponding one of the front tire pressure monitoring system sensors is inductively coupled with a primary coil of the alignment detector.

9. The method of claim 6, including detecting the front tire pressure monitoring system sensors with a transceiver of alignment detectors positioned proximate the front wheels.

10. The method of claim 6, wherein the alignment position is based on a distance between a first center of the front tires and a second center of the rear tires, and a circumference of the rear tires.

11. A system comprising:
    a first set of dynamometers configured to receive a first set of wheels;
    a second set of dynamometers configured to receive a second set of wheels,
    a plurality of alignment detectors; and
    a wheel aligner communicatively coupled to the first and second sets of dynamometers and the plurality of alignment detectors, the wheel aligner configured to:
      independently rotate the first set of dynamometers to align a first set of tire pressure monitoring system sensors corresponding to the first set of wheels;
      determine an alignment position for a second set of tire pressure monitoring system sensors corresponding to the second set of wheels;
      independently rotate the second set of wheels to position the second set of tire pressure monitoring system sensors of the rear wheels so that secondary coils of second set of tire pressure monitoring system sensors are parallel to the ground; and
      subsequently independently rotate the second set of dynamometers to position the second set of wheels into the alignment position.

12. The system of claim 11, wherein one of the plurality of alignment detectors is proximate each dynamometer in the first and second sets of dynamometers.

13. The system of claim 11, wherein the plurality of alignment detectors are configured to detect when a corresponding one of the corresponding tire pressure monitoring system sensors is positioned at a bottom of a corresponding one of wheel rims of one of the sets of wheels.

14. The system of claim 11, wherein the plurality of alignment detectors each include a primary coil to detect when a secondary coil of a corresponding one of the tire pressure monitoring system sensors is inductively coupled with the primary coil of the alignment detector.

15. The system of claim 11, wherein the plurality of alignment detectors each include a transceiver to detect messages from a corresponding of the tire pressure monitoring system sensors.

16. A method comprising:
   for front wheels of the vehicle:
      (a) positioning left and right wheels on first and second dynamometers respectively;
      (b) independently rotating the left wheel until a secondary coil of a left tire pressure sensor is parallel to the ground;
      (c) independently rotating the right wheel until a secondary coil of a right tire pressure sensor is parallel to the ground; and
   repeating steps (a)-(c) for rear wheels.

* * * * *